United States Patent [19]

Hunsbedt et al.

[11] Patent Number: 5,043,136
[45] Date of Patent: Aug. 27, 1991

[54] PASSIVE COOLING SAFETY SYSTEM FOR LIQUID METAL COOLED NUCLEAR REACTORS

[75] Inventors: Anstein Hunsbedt, Los Gatos; Charles E. Boardman, Saratoga; Marvin M. Hui, Sunnyvale; Robert C. Berglund, Saratoga, all of Calif.

[73] Assignee: General Electric Company, San Jose, Calif.

[21] Appl. No.: 541,647

[22] Filed: Jun. 21, 1990

[51] Int. Cl.$^5$ .............................................. G21C 15/18
[52] U.S. Cl. ..................................... 376/299; 376/293
[58] Field of Search ............... 376/299, 298, 293, 294, 376/295, 403, 404, 367

[56] References Cited

U.S. PATENT DOCUMENTS

| | | | |
|---|---|---|---|
| 4,362,694 | 12/1982 | Kayser | 376/298 |
| 4,678,626 | 7/1987 | Germer | 376/299 |
| 4,889,682 | 12/1989 | Gou et al. | 376/298 |
| 4,959,193 | 9/1990 | Hunsbedt et al. | 376/299 |

FOREIGN PATENT DOCUMENTS

| | | | |
|---|---|---|---|
| 2506063 | 11/1982 | France | 376/299 |
| 94190 | 4/1988 | Japan | 376/299 |

OTHER PUBLICATIONS

"Westinghouse Technology", pp. 10-11, 4/89.
"Nuclear News", pp. 77-78, 5/88.

Primary Examiner—Daniel D. Wasil
Attorney, Agent, or Firm—R. R. Schroeder

[57] ABSTRACT

A liquid metal cooled nuclear reactor having a passive cooling system for removing residual heat resulting from fuel decay during reactor shutdown. The passive cooling system comprises a plurality of partitions surrounding the reactor vessel in spaced apart relation forming intermediate areas for circulating heat transferring fluid which remove and carry away heat from the reactor vessel. The passive cooling system includes a closed primary fluid circuit through the partitions surrounding the reactor vessel and a partially adjoining secondary open fluid circuit for carrying transferred heat out into the atmosphere.

19 Claims, 4 Drawing Sheets

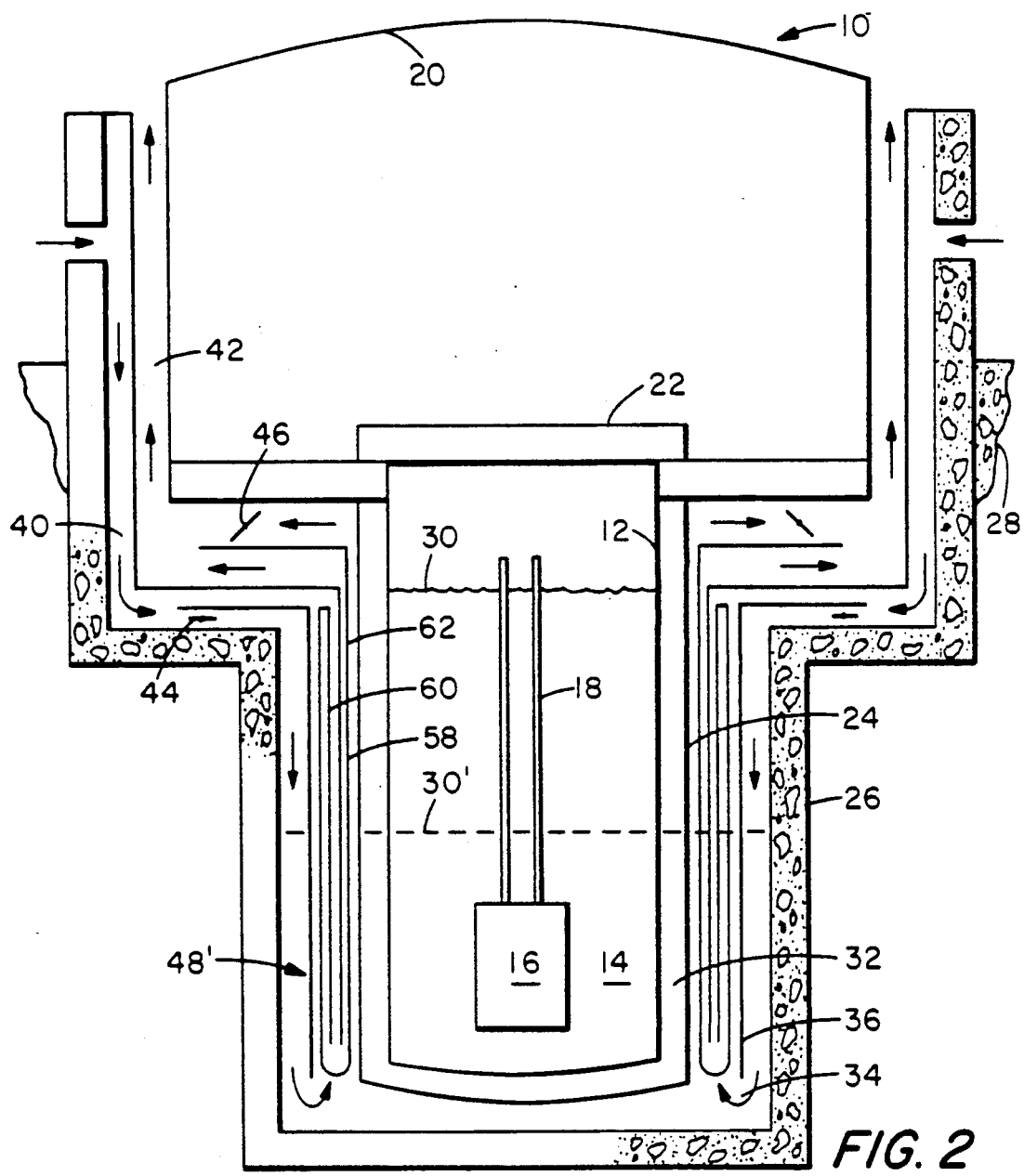
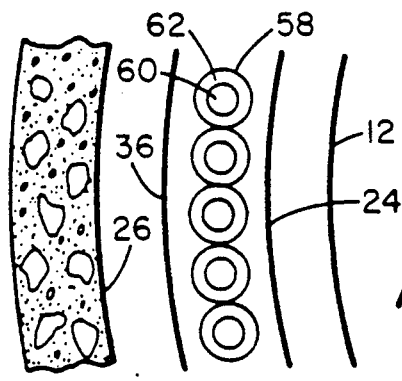
FIG. 2
FIG. 3

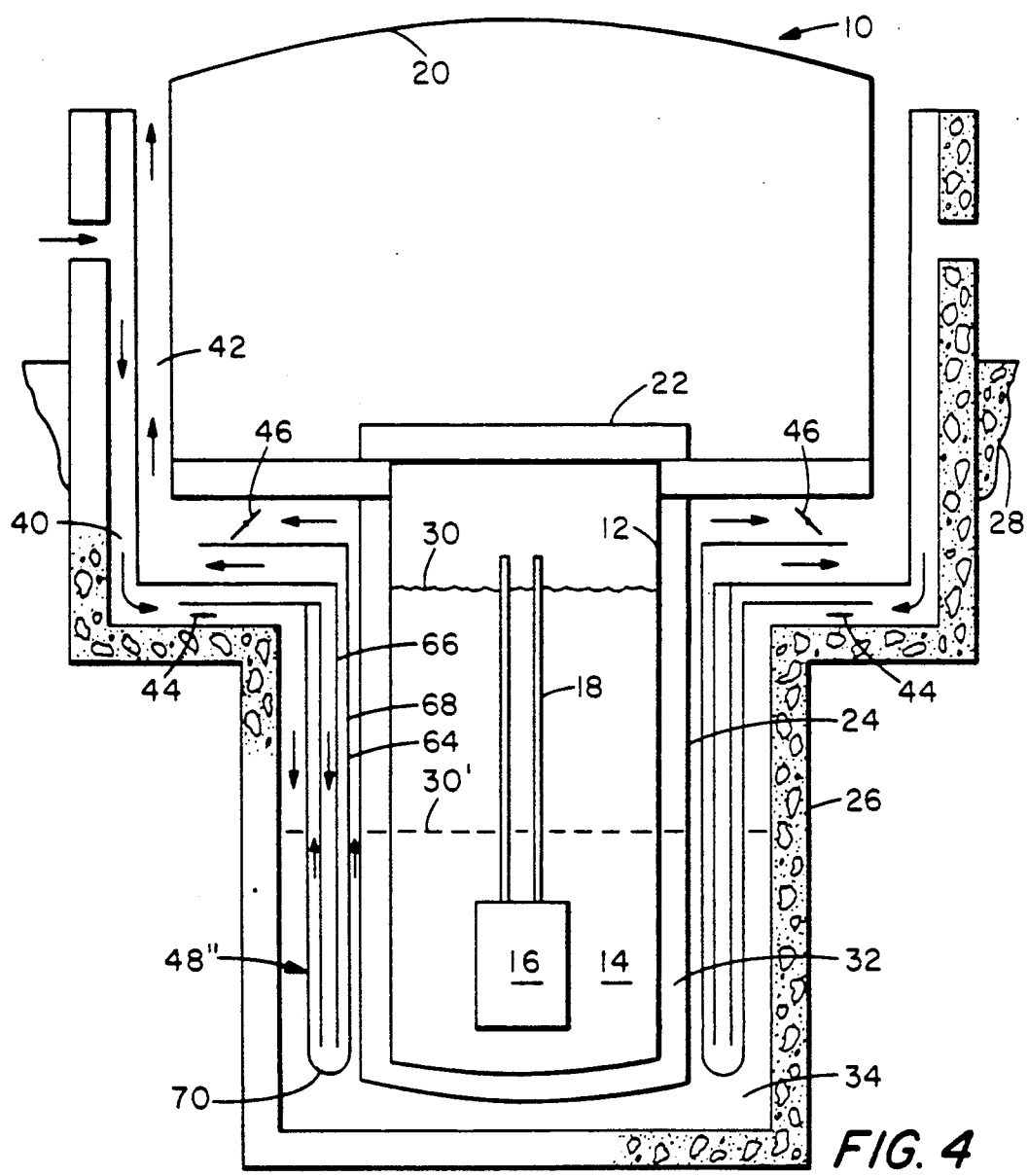
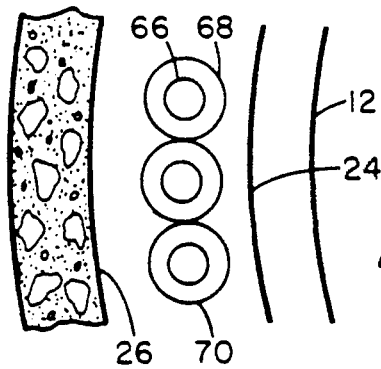
FIG. 4
FIG. 5

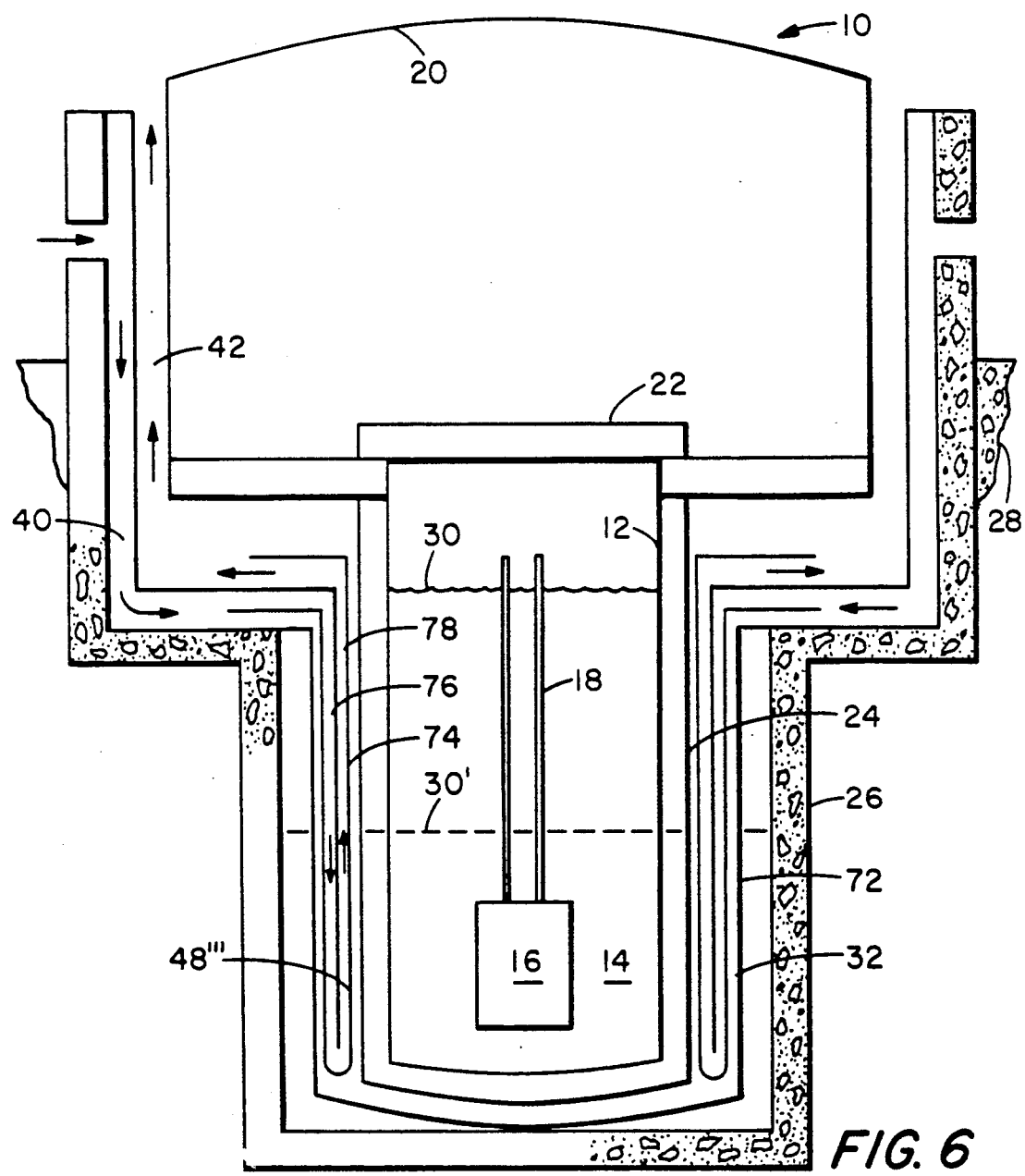
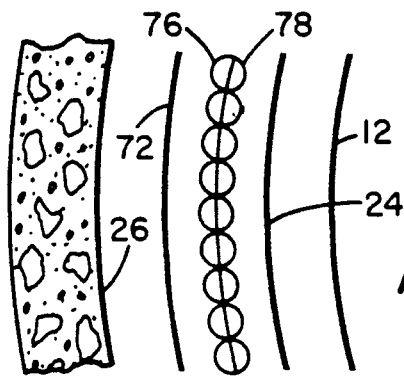
FIG. 6
FIG. 7

PASSIVE COOLING SAFETY SYSTEM FOR LIQUID METAL COOLED NUCLEAR REACTORS

The Government of the United States has rights in this invention under Contract No. DE-AC03-88SF17467. This application is related to pending application for patent Ser. No. 07/350,187, filed May 11, 1989, now U.S. Pat. No. 4,959,193.

FIELD OF THE INVENTION

This invention relates to an improvement in a passive cooling safety system for liquid metal cooled nuclear reactors having a pool of liquid metal coolant with the heat generating fissionable fuel core substantially immersed in the liquid metal pool, such as the type disclosed in U.S. Pat. No. 4,508,677, issued Apr. 2, 1985.

BACKGROUND OF THE INVENTION

In the operation of liquid sodium or sodium-potassium metal cooled nuclear reactors for power generation, it may be necessary to shut down the fission reaction of the fuel to deal with emergencies or carry out routine maintenance services. Reactor shut down is attained by inserting neutron absorbing control rods into the core of fissionable fuel to deprive the fuel of the needed fission producing neutrons. However decay of the fuel in the shut down reactor continues to produce heat in significant amounts which must be dissipated from the reactor unit.

The heat capacity of the liquid metal coolant and adjacent structure aid in dissipating the residual heat. However, the structural materials of the nuclear reactor may not be capable of safely withstanding prolonged high temperatures. For example the concrete of the walls of the typical housing silo may splay and crack when subjected to high temperatures. Accordingly, auxiliary cooling systems are commonly utilized to safely remove heat from the nuclear reactor structure during shut down.

Conventional nuclear reactors have utilized a variety of elaborate energy driven cooling systems to dissipate heat from the reactor. In many of the situations warranting a shutdown, the energy supply to the cooling systems make the cooling systems themselves subject to failure. For example, pumps and ventilation systems to cool the core may fail. Furthermore, if operator intervention is necessary, there are foreseeable scenarios in which the operator would be unable to provide the appropriate action. The most reliable and desirable cooling system would be a completely passive system which could continuously remove the residual heat generated after shutdown regardless of conditions.

Liquid metal cooled reactors such as the modular type disclosed in U.S. Pat. No. 4,508,677, utilizing sodium or sodium-potassium as the coolant provides numerous advantages. Water cooled reactors operate at or near the boiling point of water. Any significant rise in temperature results in the generation of steam and increased pressure. By contrast, sodium or sodium-potassium has an extremely high boiling point, in the range of 1800 degrees Fahrenheit at one atmosphere pressure. The normal operating temperature of the reactor is in the range of about 900 degrees Fahrenheit. Because of the high boiling point of the liquid metal, the pressure problems associated with water cooled reactors and the steam generated thereby are eliminated. The heat capacity of the liquid metal permits the sodium or sodium-potassium to be heated several hundred degrees Fahrenheit without danger of materials failure in the reactor.

The reactor vessels for pool-type liquid-metal cooled reactors are essentially open top cylindrical tanks without any perforations to interrupt the integrity of the vessel walls. Sealing of side and bottom walls is essential to prevent the leakage of liquid metal from the primary vessel. The vessel surfaces must also be accessible for the rigorous inspections required by safety considerations.

In the typical sodium cooled reactor, two levels of heat conveying sodium loops or cooling circuits are used. Usually, a single primary loop and two or more secondary loops are used. The primary heat transferring loop contains very radioactive sodium which is heated by the fuel rods. The primary loop passes through heat exchangers to exchange the heat with one of the non-radioactive secondary sodium loops. In general, sodium cooled reactors are designed to incorporate redundant secondary heat transferring loops in the event of failure of one loop.

Upon shutdown of the reactor by fully inserting the control rods, residual heat continues to be produced and dissipated according to the heat capacity of the plant. Assuming that the reactor has been at full power for a long period of time, during the first hour following shutdown, an average of about 2% of full power continues to be generated. The residual heat produced continues to decay with time.

Exaggerated conservative safety concerns for dealing with postulated worst possible scenario accident conditions have raised questions as to means for coping with events such as the coincidental failure of both the reactor vessel and the containment or guard vessel, whereupon liquid coolant loss due to the resulting leakage could significantly lower the coolant level within the reactor vessel. Reduced reactor coolant levels can significantly impede or interrupt the normal coolant circulation flow through a coolant loop or circuit, whereby heat is transported away from the fuel core. This impediment or termination due to reduced coolant level also applies to designed passive cooling systems employing inherent processes comprising the natural convection of fluids, conduction, radiation and convection, as a means of removing heat through its transfer by such means. Other such improbable extreme events possible effecting coolant levels include a hypothetical core disassembly accident that damages the fuel core and results in expulsion of coolant such as sodium up into the head access area of the reactor structure, or a maintenance accident involving a break in the reactor closure head.

This invention comprises an improvement upon the passive cooling safety system for removing shutdown decay heat from a liquid metal cooled nuclear reactor such as the unit disclosed and claimed in U.S. Pat. No. 4,678,626, issued Dec. 2, 1985.

The disclosed contents of the above noted U.S. Pat. No. 4,508,677 and U.S. Pat. No. 4,678,626, comprising related background art, are incorporated herein by reference.

SUMMARY OF THE INVENTION

This invention comprises an improved emergency shut down, and safety passive heat removal system for liquid metal cooled nuclear reactors which transfers reactor decay and sensible heat from the fuel core and liquid metal coolant by means of the inherent thermal energy transfer mechanisms of conduction, radiation, convection and natural convection of fluids out to the ambient atmosphere. The improved safety system of the invention is entirely passive and operates continuously through the inherent phenomenon of natural convection in fluids, conduction, convection, and thermal radiation.

The invention specifically includes a first fluid flow heat exchanging circuit for the passage of atmosphere air coolant through a portion of the nuclear reactor plant to remove heat therefrom and dissipate the heat from the containment housing out into the surrounding atmosphere. A second fluid flow heat exchanging circuit for the passage of fluid coolant to a lower portion of the reactor plant through ducts and return to transfer heat to the first circuit is provided to remove heat in the event of an accidental reduction of the reactor coolant level retarding the normal mechanism of heat transfer and dissipation, and the possible contamination of fluid coolant flowing through the first fluid flow circuit and in turn escape of contaminates out into the atmosphere.

In the event of a reactor shutdown, after the control rods are fully inserted into the fuel core, the heat generated by the fuel rods is transferred through the reactor vessel across an inert gas gap to the surrounding containment vessel primarily by thermal radiation, with a small fraction of the heat transferred by conduction and convection in the contained inert gas. Surfaces of high thermal emissivity provided on the outside of the reactor vessel and the interior of the containment vessel increase the efficiency of the heat transfer.

Heat is then removed from the outside surface of the containment vessel partly by thermal radiation and partly by direct convection to the circulating fluid in the passage between the containment vessel and the silo or the guard vessel. Modular reactor vessels have approximately one third the diameter and are about the same height as conventional nuclear reactor vessels. In modular reactors, the ratio of the surface area to the power generated is approximately three times greater than the surface area to power ratio in a conventional and large reactor. This provides sufficient surface area over which the residual heat may be passively dissipated. The highly emissive exterior surfaces of the containment vessel also enhance the heat transfer. Thus, the present invention eliminates the necessity of redundant secondary sodium loops. A single secondary loop can function safely with the passive auxiliary cooling system as the alternative cooling mechanism.

OBJECTS OF THE INVENTION

It is a primary object of this invention to provide an improved passive cooling safety system for liquid metal cooled nuclear reactor for the removal of decay and sensible heat under adverse conditions.

It is also an object of this invention to provide an indirect cooling safety system for the passive cooling of liquid metal cooled nuclear reactors comprising a core of fissionable fuel substantially immersed within a pool of liquid metal coolant.

It is another object of this invention to provide an improved passive cooling safety system for liquid metal cooled nuclear reactors comprising a second cooling circuit for removing heat from a reduced level of reactor coolant.

It is a further object of this invention to provide a heat removing safety system for liquid metal cooled nuclear reactors which is entirely passive and operates continuously by the inherent phenomenon of natural convection in fluids, conduction, convection, and thermal radiation.

It is a still further object of this invention to provide an improved passive safety system for removing decay and sensible heat produced during shut down in a liquid metal cooled nuclear reactor utilizing a combination of alternate fluid circuits including a second circulating flow course for removing heat from a reduced level of reactor coolant resulting from coolant leakage due to ruptures in both the reactor vessel and the containment vessel.

BRIEF DESCRIPTION OF THE DRAWINGS

FIG. 2 is a schematic illustration of a liquid metal cooled nuclear reactor plant in cross-section showing a variation of the invention;

FIG. 3 is an exploded view illustrating in detail a portion of the composite side structure of the variation shown in FIG. 2;

FIG. 4 is a schematic illustration of a liquid metal cooled nuclear reactor plant in cross-section showing another variation of the invention;

FIG. 5 is an exploded view illustrating in detail a portion of the composite side structure of the variation shown in FIG. 4;

FIG. 6 is a schematic illustration of a liquid metal cooled nuclear reactor plant in cross-section showing a further variation of the invention; and FIG. 7 is an exploded view illustration in detail a portion of the composite side structure of the variation shown in FIG. 6.

DETAIL DESCRIPTION OF THE INVENTION

Figure 1:
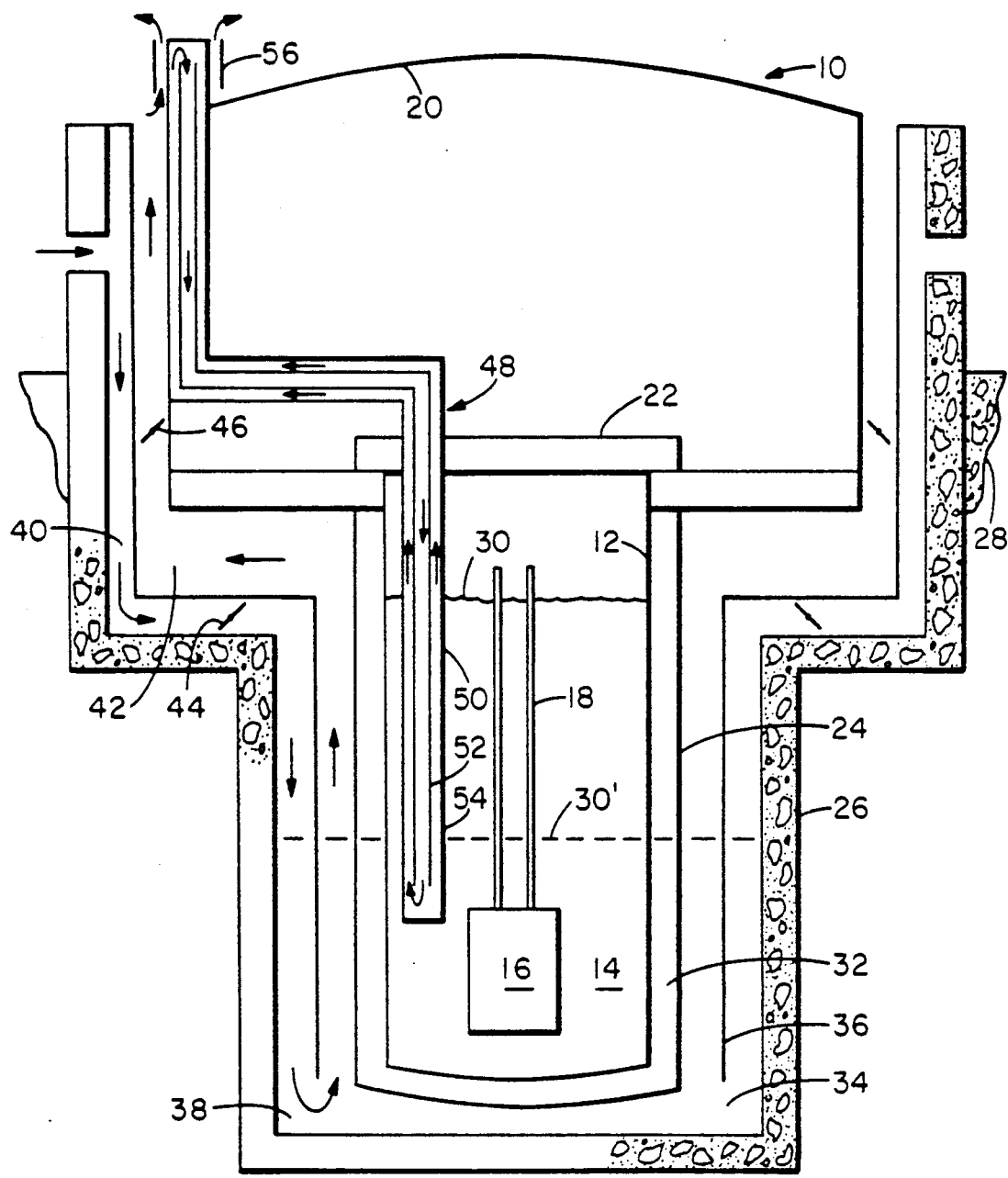
FIG. 1 is a schematic illustration of a liquid metal cooled nuclear reactor plant in cross-section.

Modular pool-type liquid-metal cooled reactors have sufficient surface area to accommodate dissipation of residual heat during reactor shutdown events. Overall, the reactor system has a relatively small heat capacity. The problem remaining is to dissipate the residual heat without significantly extending damage to the containment structures. A completely passive cooling system eliminates reliance on energy driven pumps and fans and the need for operator intervention. At the same time, the reactor vessel itself must not be structurally modified due to the size constraints on modular reactors, and the necessity of a smooth, unperforated tank structure to prevent any areas where stresses might accumulate. Strict inspection requirements also require that the reactor vessel be simple to inspect both during manufacture and erection of the structure.

Referring to FIG. 1 of the drawings, an embodiment of a modular pool-type, liquid metal cooled nuclear reactor plant 10, comprises a reactor vessel 12, typically consisting of an cylindrical tank positioned with its longitudinal axis extending vertically upright, and having an open upper end provided with a removable cover. Reactor vessel 12 contains a pool of liquid metal coolant 14, such as sodium metal, with a heat producing core of fissionable fuel 16 substantially immersed within the liquid metal coolant pool 14 for cooling the core. Fission action of the fuel and the rate thereof is governed by neutron absorbing control rods 18 moving out from or into the fuel core 16.

A containment housing structure 20 encloses the upper portion of the nuclear reactor plant 10 isolating it from the external atmosphere to preclude the escape of radioactive material or other contaminants from the reactor vessel 12 resulting from either the removal of vessel cover 22 for maintenance service or its accidental displacement. The containment vessel 24 concentrically surrounds the reactor vessel 12, in spaced apart relation. A concrete silo 26 surrounds and contains the concentrically combined and spaced apart containment vessel 24 and reactor vessel 12.

Preferably the concrete silo 26 is substantially buried into the ground to the extent that its contained reactor vessel 12 and adjoining vessels are located at least below the ground surface, shown in the drawings as 28. Locating the liquid metal coolant containing reactor vessel below ground surface precludes the escape of any liquid metal regardless of any loss of integrity of the reactor confining vessels, such as the unlikely rupture of both the reactor and containment vessels 12 and 24. However, the breach of both the reactor vessel 12 and the containment vessel 24 can result in a potentially serious event due to the lowering of the level of the liquid metal coolant 14, through leakage therefrom, from its normal operating level 30 down to sub level 30' that evades circulation through the conventional cooling circuits and means.

The lowest reduced level of liquid metal coolant resulting from its leakage out from both the reactor and containment vessels 12 and 24 can be readily determined by comparing the volume of the liquid metal coolant contained in the reactor vessel 12 during normal operating conditions with the volume contained in the area between the containment vessel 24 and inner wall of the concrete silo 26. Thus if both the reactor and containment vessels are breached in their lower regions, there will be established a lowest common level 30' when the liquid coolant leakage reaches level equilibrium through all retaining vessels including the silo 26.

This arrangement of these combined retaining vessel components in surrounding or encircling and spaced apart positions, provides for their respective cylindrical side walls forming a series of partitions with intermediate spaces. Specifically, a space 32 between the partitions comprising the side walls of reactor vessel 12 and containment vessel 24, and a space 34 between the partitions comprising the side walls of the containment vessel 24 and the concrete silo 26.

In a preferred embodiment of the invention wherein the above combined components are circular in cross-section and concentrically surround or encircle one another, the intermediate spaces 32 and 34 are each substantially annular in cross-section.

A cylindrical baffle 36 divides the annular space 34 into an annular fluid downcomer and an annular fluid riser surrounding the containment vessel 24 to provide a passive cooling fluid flow heat exchanger circuit 38 for the removal of thermal energy from the outer surface the reactor vessel, such as decay heat produced during reactor shutdown. This passive cooling circuit 38 comprises circulating ambient air coolant from the external atmosphere into downward flowing duct(s) 40 and through the downcomer adjacent to the outer surface baffle 36 in space 34 to substantially the bottom of the silo 26, around the lower edge of baffle 36 and continuing up through the riser adjacent the inner side of baffle 36 in space 34. From space 34, the air coolant continues upward through the circuit 38 carrying heat from the outer surface of the combined containment and reactor vessels 24 and 12, and passes on through upward flowing air duct(s) 42. This cooling circuit 38 and its function is entirely passive and operates by itself continuously through the inherent phenomenon of natural convection in fluids, conduction, convection, and thermal radiation.

Air coolant flow control valves 44 and 46 are provided in down flowing air duct(s) 40 and up flowing air duct(s) 42, respectively, to regulate the volume of air coolant flow through the ducts or to terminate the air passage therethrough.

The foregoing self-operating passive cooling system is highly effective in protectively removing heat from the reactor core without the assistance of mechanical or electrical means such as switches, sensors, pumps and the like. This system is particularly useful for removing decay heat produced by the fuel core during reactor shut down, and requires no personnel assistance.

However, in the event of an unlikely occurrence comprising the dual rupture of both the reactor vessel 12 and containment vessel 24, leakage of the liquid metal coolant 14 from both retaining vessels can significantly reduce the coolant level within the reactor. For instance, leakage of liquid coolant 14 out beyond the retaining vessels 12 and 24 into the concrete silo 26 can drop the surface of the coolant 14 from an effective operating level of about 30 down to a level such as 30' which precludes circulation of the coolant though the conventional heat exchanger circuits or loops of the reactor. In such an event, the conventional reactor cooling systems are rendered ineffective, and supplemental means such as the passive heat removal systems of the prior art or as described above are obstructed with liquid metal coolant leaked into their circuit fluid flow passages and thus also rendered ineffective.

In accordance with this invention an ancillary passive cooling safety system 48 is provided with a second fluid flow heat exchanger circuit for the passage of fluid coolant down substantially below any reduced level of the reactor liquid metal coolant and which is closed to the liquid metal and its entrained radioactive containments.

Referring to FIG. 1, an embodiment of this invention comprises a passive cooling safety system 48 having a concentrically arranged fluid flow circuit 50 located within the reactor vessel 12, extending downward therein substantially to its lower end. Circuit 50 provides for coolant flow downward in an inner tube 52 down to substantially adjacent the fuel core 16 within reactor vessel 12 and return back upward in an outer annular tube 54. Circuit 50 of this embodiment extends down into the reactor vessel 12 a substantial distance below the leak level 30' of the reactor liquid metal coolant. Fluid coolant, such as air, in circuit 50 carries heat from within the reactor vessel 12 upward to a heat exchanger arrangement consisting of chamber(s) 56 for transfer of the heat and its dissipation by venting out into the atmosphere. Since the portion of circuit 50 extending within the reactor vessel 12 is closed, contact with radioactive material is excluded and the fluid carrying heat can be dissipated out into the atmosphere. Preferably a multiplicity of such concentrically arranged fluid flow circuits 50 are positioned in reactor vessel 12 to provide ample cooling capacity. In an alternate conventional embodiment of the invention, several fluid carrying tubes are headered into heat exchanger units, one unit located below the sodium level and one unit in the outside air atmosphere, and a cooling fluid such as sodium is carried in single pipes, one carrying cold fluid and the other carrying hot fluid.

Referring to FIG. 2 and 3, another embodiment of the invention for a passive cooling safety system 48' comprising at least one concentrically arranged fluid flow circuit 58 extending downward into the space 34 between baffle 36 and the containment vessel 24 to approximately the lower end of the reactor and containment vessels 12 and 24. Circuits 58 each include an inner central tube or duct 60 for conducting coolant downward substantially along the length of the reactor vessel 12 and its upward return, carrying heat, through an outer tube or duct 62 surrounding tube 60. Tubes 60 are in fluid communication with down flowing duct(s) 40, and outer surrounding tubes 62 are in fluid communication with the up flowing duct(s) 42. Thus, ambient air coolant drawn into down flowing duct 40 from the outer atmosphere can be diverted into tubes 60 of the circuits 58 flowing down the length thereof and reversing direction to continue up through tubes 62, carry heat away from the reactor vessel 12, and discharge into up flowing air duct 42 for venting out into the atmosphere to dissipate the removed heat.

The cooling circuit of this embodiment is effective when the level of the liquid metal reactor coolant is reduced by leakage into the concrete silo 26, such as to level 30', and the mechanism of circulation is entirely passive or self motivated. Moreover, the cooling circuit is closed with respect to the liquid metal reactor coolant whereby radioactive containments are not entrained and released into the atmosphere. Thus, this cooling circuit functions effectively following reactor and containment vessel leaks and valves 44 and 46 have been closed to prevent communication between this silo atmosphere with the outside atmosphere.

The embodiment shown in FIGS. 4 and 5 utilizes a specific arrangement of a passive cooling safety system 48" comprising multiple circuits 64 composed of concentric tubes comprising an inner central tube(s) 66 and an outer surrounding annular tube(s) 68. The arrangement of this embodiment serves as both fluid flow circuits 64 for cooling the reactor core and a cylindrical baffle 70 in space 34 which replaced baffle 36 by performing the function of defining a coolant flow course substantially to the bottom of space 34 for the normal air cooling system which operates when there are no vessel leaks. As shown, joined together the concentric tubes 66 and 68 form a cylinderical wall extending downward in space 34 intermediate the concrete silo, 26 and the containment vessel 24 surrounding the containment and reactor vessels 24 and 12. The adjoining cylindrical wall of concentric tube essentially perform the same role as baffle 36 while also being capable of performing as an ancillary passive cooling safety system.

For instance, during normal operation of the passive cooling safety system, coolant fluid, such as air from the outer atmosphere is drawn into down flowing duct(s) 40 and passes downward in space 34 between the concrete silo 26 and the outer face of the baffle 70 formed by adjoined concentric tubes 66 and 68, to the lower end of the tubes substantially adjacent to the bottom of the silo 26. Thereupon, the fluid flow path reverses direction around the lower end of tubes 66 and 68 and passes upward in space 34 between the inner face of the baffle 70 and the containment vessel 24, absorbing heat from the surface of the latter. The coolant carrying heat enters into the up flowing duct 42 whereupon it is vented out into the atmosphere to dissipate the transported heat.

The passive cooling system 48" provides for cooling fluid to be diverted from the down flowing duct 40 into inner tubes 66 whereupon it flows down and out the lower end into surrounding tubes 68 and reverses direction and continues up through surrounding tube 68, absorbing heat from the reactor. From tube 68 the coolant with carried heat passes on to the up flowing duct 42 and on to be vented to the atmosphere to dissipate the heat.

A further embodiment of this invention is shown in FIGS. 6 and 7, and comprises a guard vessel 72 in space 32 intermediate the containment vessel 24 and the silo 26. The passive cooling safety system 48'" of this embodiment also comprises multiple circuits 74. Circuits 74 comprise a series of fluid flow carrying tubes with each divided into two sections along their length except at their lower end where both sections of each tube are in fluid communication with each other. Specifically the fluid flow carrying tubes shown in FIGS. 6 and 7 comprise two adjoined semicircular tubes, an outer semicircular tube 76 which is fluid communication with down flowing air duct 40, and an inner semicircular tube 78 which is in fluid communication with the up flowing air duct 42. The tube configuration can also be the concentric arrangement described above and shown e.g. in FIGS. 4 and 5 or the tubes can be of U-type confiuration where one leg carries cold air downward and the other leg hot air upward.

Thus, atmospheric air drawn downward into air duct 40 can be diverted into semicircular tubes 76, continuing passage down tube 76 to its lower end, then across into and up within an adjoining semicircular tube 78 while absorbing heat from the reactor vessel 12. From tubes 78, the coolant flow carrying heat is discharge into the up flowing duct 42 whereupon the fluid coolant and heat are vented out into the atmosphere to dissipate the heat carried from the reactor. The passive cooling system 48'" functions both as the normal (non-leak) cooling system and as the backup cooling system following leaks in both the reactor vessel 12 and guard vessel 72 and requires no operator actuated flow control valves.

What is claimed is:
1. A passive cooling system for liquid metal cooled nuclear reactors having a reactor vessel containing a pool of liquid metal coolant with a heat generating fissionable fuel core immersed in the liquid metal coolant, the passive cooling system including a heat exchanging means physically isolated from the liquid metal coolant for coping with a reduced level of liquid metal coolant within the reactor vessel due to leakage resulting from reactor vessel and containment vessel ruptures, comprising the combination of:

a reactor vessel containing a pool of liquid meal coolant with a core of fissionable fuel immersed therein and a side wall of the reactor vessel providing an innermost first partition;

a containment vessel substantially surrounding the reactor vessel in spaced apart relation with the reactor vessel and a side wall of the containment vessel providing a second partition forming an intermediate area with the spaced apart innermost first partition;

a concrete silo substantially surrounding the containment vessel in spaced apart relation with the containment vessel and a side wall of the silo providing an outermost third partition forming an intermediate area with the spaced apart second partition;

a first fluid flow heat exchanger circuit for the passage of atmospheric air coolant extending downward through the area intermediate the concrete silo and the containment vessel approximately the length of the containment vessel and then cycling back upward and returning out into the atmosphere; and a second fluid flow heat exchanger circuit for the passage of fluid coolant having a portion extending downward from above the reactor vessel to a level below that of the reduced liquid metal coolant level resulting from leakage out of the reactor vessel and the containment vessel into the concrete silo which is closed to any such coolant leakage, and then cycling back upward making heat transferring contact with the first coolant fluid flow circuit which is open to the atmosphere for transfer of thermal energy from the coolant passing through the second fluid flow circuit to the air coolant passing through the first fluid flow circuit and dissipation of the transferred thermal energy out into the atmosphere.

2. A passive cooling system for liquid metal cooled nuclear reactor having a reactor vessel containing a pool of liquid metal coolant with a heat generating fissionable fuel core immersed in the liquid metal coolant, the passive cooling system including a heat exchanging means physically isolated from the liquid metal coolant for coping with a reduced level of liquid metal coolant within the reactor vessel due to leakage resulting from reactor vessel and containment vessel ruptures, comprising the combination of: a reactor vessel containing a pool of liquid metal coolant with a core of fissionable fuel immersed therein and a side wall of the reactor vessel providing an innermost first partition;

a containment vessel substantially surrounding the reactor vessel in spaced apart relation with the reactor vessel and a side wall of the containment vessel providing a second partition forming an intermediate area with the spaced apart inner most first partition;

a concrete silo substantially surrounding the containment vessel in spaced apart relation with the containment vessel and a side wall of the silo providing an outermost third partition forming an intermediate areas with the spaced apart second partition;

a first fluid flow heat exchanger circuit for the passage of atmospheric air coolant extending downward through the area intermediate the concrete silo and the containment vessel approximately the length of the containment vessel and then cycling back upward and returning out into the atmosphere; and a second fluid flow heat exchanger circuit for the passage of fluid coolant extending downward from above the reactor vessel into the interior of the reactor vessel to a level below that of the reduced liquid metal coolant level resulting from leakage out of the reactor vessel and the containment vessel into the concrete silo, and then cycling back upward making heat transferring contact with the first coolant fluid flow circuit which is open to the atmosphere for transfer of thermal energy from the coolant passing through the second fluid flow circuit to the air-coolant passing through the first fluid flow circuit and dissipation of the transferred thermal energy out into the atmosphere.

3. The passive cooling system for liquid metal cooled nuclear reactors of claim 1, wherein the second fluid flow heat exchanger circuit extend down into the intermediate area of space between the concrete silo and the containment vessel.

4. The passive cooling system for liquid metal cooled nuclear reactors of claim 1, wherein the second fluid flow heat exchanger circuit comprises a multiplicity of concentrically arranged ducts providing a portion of the closed fluid flow circuit.

5. A passive cooling system for liquid metal cooled nuclear reactors having a reactor vessel containing a pool of liquid metal coolant with a heat generating fissionable fuel core immersed in the liquid metal coolant, the passive cooling system including a heat exchanging mean physically isolated from the liquid metal coolant for coping with a reduced level of liquid metal coolant within the reactor vessel due to leakage resulting from reactor vessel and containment vessel ruptures, comprising the combination of:

a reactor vessel containing a pool of liquid metal coolant with a core of fissionable fuel immersed therein and a side wall of the reactor vessel providing an innermost first partition;

a containment vessel substantially surrounding the reactor vessel in spaced apart relation with the containment vessel and a side wall of the containment vessel providing a second partition forming an intermediate area with the spaced apart innermost first partition;

a concrete silo substantially surrounding the containment vessel in spaced apart relation with the containment vessel and a side wall of the silo providing an outermost third partition forming an intermediate area with the spaced apart second partition;

a first fluid flow heat exchanger circuit for the passage of atmospheric air coolant extending downward through the area intermediate the concrete silo and the containment vessel approximately the length of the containment vessel and then cycling back upwards and returning out into the atmosphere; and a closed second fluid flow heat exchanger circuit for the passage of fluid coolant extending downward from above the reactor vessel into the interior of the reactor vessel to a level below that of the reduced liquid metal coolant level resulting from leakage out of the reactor vessel and containment vessel into the surrounding concrete silo, and then cycling back upward and passing in adjoining heat transferring contact with the first coolant fluid flow circuit which is open to the atmosphere for indirect transfer of thermal energy from the coolant passing through the closed second fluid flow circuit to the air coolant passing through the first fluid flow circuit and dissipation of the transferred thermal energy out into the atmosphere.

6. The passive cooling system for liquid metal cooled nuclear reactors of claim 5, wherein the closed second fluid flow heat exchanger circuit comprises at least one pair of concentrically arranged ducts providing a portion of the closed fluid flow circuit.

7. The passive cooling system for liquid metal cooled nuclear reactors of claim 5, wherein a cylindrical baffle is positioned in spaced apart relationship within the intermediate areas between the side walls of the concrete silo and containment vessel and encircling substantially the length of the side wall of the containment vessel to from a flow baffle in the first fluid flow heat exchanger circuit for directing the passage of atmospheric air coolant downward intermediate the concrete silo and cylindrical baffle, around the lower end of the cylindrical baffle and cycling back upward intermediate the cylindrical baffle and the containment vessel on out into the atmosphere.

8. The passive cooling system for liquid metal cooled nuclear reactors of claim 5, wherein the closed second fluid flow heat exchanger circuit comprises at least one pair of concentrically arranged ducts containing liquid metal coolant.

9. The passive cooling system for liquid metal cooled nuclear reactors of claim 5, wherein a plurality of closed second fluid flow heat exchanger circuits comprising concentrically arranged ducts containing sodium extending down into the interior of the reactor vessel to approximately adjacent to the top of the fuel core.

10. The passive cooling system for liquid metal cooled nuclear reactors having a reactor vessel containing a pool of liquid metal coolant with a heat generating fissionable fuel core immersed in the liquid metal coolant, the passive cooling system including a heat exchanging means physically isolated from the external atmosphere for coping with a reduced level of liquid metal coolant within the reactor vessel due to leakage resulting from reactor vessel and containment vessel ruptures, comprising the combination of:

a reactor vessel containing a pool of liquid metal coolant with a core of fissionable fuel immersed therein and a side wall of the reactor vessel providing an innermost first partition;

a containment vessel substantially surrounding the reactor vessel in spaced apart relation with the reactor vessel and a side wall of the containment vessel providing a second partition forming an intermediate area with the spaced apart innermost first partition;

a concrete silo substantially surrounding the containment vessel in spaced apart relation with the containment vessel and a side wall of the silo providing an outermost third partition forming an intermediate area with the spaced apart second partition;

a fluid flow heat exchanger circuit for the passage of atmospheric air coolant downward through the area intermediate the concrete silo and the containment vessel extending approximately the length of the containment vessel and then cycling back upward and returning out into the atmosphere to dissipate any transferred heat;

a fluid flow heat exchanger circuit for the passage of fluid coolant comprising a multiplicity of flow ducts extending downward from above the reactor vessel into the intermediate area of the space between the concrete silo and the containment vessel and then cycling back upward and passing into heat transferring contact with the coolant flow circuit which is open to the atmosphere for transfer of thermal energy from the coolant passing through the fluid flow circuit comprising a multiplicity of flow ducts to the air coolant passing through the fluid flow circuit which is open to the atmosphere and dissipation of the transferred thermal energy out into the atmosphere.

11. The passive cooling system for liquid metal cooled nuclear reactors of claim 10, wherein the fluid flow heat exchanger circuit comprises a multiplicity of paired concentrically arranged ducts providing a portion of the fluid flow circuit closed to the liquid metal coolant.

12. The passive cooling system for liquid metal cooled nuclear reactors of claim 10, wherein the fluid flow heat exchanger circuit comprises a multiplicity of paired adjoined ducts providing a portion of the fluid flow circuit closed to the liquid metal coolant.

13. The passive cooling system for liquid metal cooled nuclear reactors of claim 10, wherein the fluid flow heat exchanger circuit comprising flow ducts extends downward from above the reactor vessel into the intermediate area of the space between the concrete silo and the containment vessel to approximately adjacent to the lower end of the reactor vessel.

14. The passive cooling system for liquid metal cooled nuclear reactors claim 10, wherein the fluid flow heat exchanger circuit comprising flow ducts further comprises a multiplicity of paired ducts encircling the containment vessel.

15. A passive cooling system for liquid metal cooled nuclear reactors having a reactor vessel containing a pool of liquid metal coolant with a heat generating fissionable fuel core immersed in the liquid metal coolant, the passive cooling system including a heat exchanging means physically isolated from the liquid metal coolant for coping with a reduced level of liquid metal coolant within the reactor vessel due to leakage resulting from reactor vessel and containment vessel ruptures, comprising the combination of:

a reactor vessel containing a pool of liquid metal coolant with a core of fissionable fuel immersed therein and a side wall of the reactor vessel providing an innermost first partition;

a containment vessel substantially surrounding the reactor vessel in spaced apart relation with the reactor vessel and a side wall of the containment vessel providing a second partition forming an intermediate area with the spaced apart innermost first partition;

a concrete silo substantially surrounding the containment vessel in spaced apart relation with the containment vessel and a side wall of the silo providing an outermost third partition forming an intermediate area with the spaced apart second partition;

a guard vessel substantially surrounding the reactor vessel position in spaced apart relationship within the intermediate area between the side walls of the concrete silo and containment vessel;

a fluid flow heat exchanger circuit for the passage of atmospheric air coolant downward through the area intermediate the containment vessel and the guard vessel approximately the length of the containment vessel and then cycling back upward and returning out into the atmosphere;

and a second fluid flow heat exchanger circuit for the passage of fluid coolant comprising a multiplicity of adjoined flow ducts extending downward from above the reactor vessel to a level below that of the reduced liquid metal coolant level resulting from leakage out of the reactor vessel and the containment vessel into the guard vessel and then cycling back upward and passing into heat transferring contact with the coolant fluid flow circuit which is open to the atmosphere for transfer of the thermal energy from the coolant passing through the fluid flow circuit comprising a multiplicity of adjoined flow ducts to the air coolant passing through the fluid flow circuit which is open to the atmosphere and dissipation of the transferred thermal energy out into the atmosphere.

16. The passive cooling system for liquid metal cooled nuclear reactors of claim 15, wherein the fluid flow heat exchanger circuit comprising flow ducts consist of a multiplicity of paired concentrically arranged ducts providing a portion of the fluid flow circuit closed to the liquid metal coolant.

17. The passive cooling system for liquid metal cooled nuclear reactors of claim 15, wherein the fluid flow heat exchanger circuit comprising flow ducts consist of a multiplicity of paired adjoining ducts providing a portion of the fluid flow circuit closed to the liquid metal coolant.

18. The passive cooling system for liquid metal cooled nuclear reactors of claim 15, wherein the fluid flow heat exchanger circuit comprising flow ducts consist of a multiplicity of paired ducts encircling the guard vessel.

19. The passive cooling system for liquid metal cooled nuclear reactors of claim 15, wherein the fluid flow heat exchanger circuit comprising flow ducts extends downward from above the reactor vessel into the intermediate area of the space between the containment vessel and the guard vessel.

* * * * *